US009766979B2

(12) United States Patent
Grimsrud et al.

(10) Patent No.: US 9,766,979 B2
(45) Date of Patent: Sep. 19, 2017

(54) ERROR CORRECTION IN SOLID STATE DRIVES (SSD)

(71) Applicant: Intel Corporation, Santa Clara, CA (US)

(72) Inventors: Knut S. Grimsrud, Forest Grove, OR (US); Jawad B. Khan, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/007,686

(22) Filed: Jan. 27, 2016

(65) Prior Publication Data

US 2016/0321134 A1    Nov. 3, 2016

Related U.S. Application Data

(63) Continuation of application No. 14/093,936, filed on Dec. 2, 2013, now Pat. No. 9,262,267.

(51) Int. Cl.
*G06F 11/10* (2006.01)

(52) U.S. Cl.
CPC ........ *G06F 11/108* (2013.01); *G06F 11/1044* (2013.01); *G06F 11/1048* (2013.01); *G06F 11/1064* (2013.01); *G06F 11/1068* (2013.01); *G06F 11/1076* (2013.01); *G06F 2211/109* (2013.01); *G06F 2211/1009* (2013.01)

(58) Field of Classification Search
CPC .... G06F 11/1068; G06F 11/108; G06F 11/10; G06F 11/1044; G06F 11/1076; G06F 2211/1009; H03M 13/05
USPC .......................................... 714/763, 758, 766
See application file for complete search history.

(56) References Cited

U.S. PATENT DOCUMENTS

| 8,650,463 | B2 * | 2/2014 | Lim .................... G06F 11/10 714/766 |
| 8,769,375 | B2 * | 7/2014 | Lee .................. G06F 11/1068 714/763 |
| 2010/0016974 | A1 | 1/2010 | Janowski et al. |
| 2010/0169743 | A1 | 7/2010 | Vogan et al. |
| 2012/0254694 | A1 * | 10/2012 | Golov ............... G06F 11/1044 714/763 |
| 2015/0019933 | A1 * | 1/2015 | Yamazaki .......... G06F 11/1008 714/758 |

* cited by examiner

*Primary Examiner* — James C Kerveros
(74) *Attorney, Agent, or Firm* — Compass IP Law PC

(57) ABSTRACT

A paging scheme for a Solid State Drive (SSD) error correction mechanism that exchanges portions of a parity component, such as a page, between SRAM and less expensive DRAM, which stores the remainder of a context of pages. A parity operation applies an XOR function to corresponding memory positions in the pages of the context. Dedicated error correction (parity) SRAM need only enough memory for portions of memory, typically a cache line of a page, upon which the parity operation (XOR) is operating. The remaining portions in the context are swapped, or paged out, by cache logic such that the entire context is iteratively processed (XORed) by the parity operation.

23 Claims, 4 Drawing Sheets

ERROR CORRECTION IN SOLID STATE DRIVES (SSD)

CROSS REFERENCE TO RELATED APPLICATIONS

This application is a continuation of U.S. patent application Ser. No. 14/093,936 filed Dec. 2, 2013 entitled ERROR CORRECTION IN SOLID STATE DRIVES (SSD).

BACKGROUND

A solid state disk (SSD) is a high performance storage device that employs non-volatile flash memory such as NAND and contains no moving parts. SSDs are much faster than typical hard disk drives (HDD) with conventional rotating magnetic media. A controller in the SSD manages operations of the SSD, including data storage and access as well as communication between the SSD and a host device. Since SSDs employ NAND memory components instead of rotating magnetic platters, physical constraints of data retention and recording accuracy differ. Due to the differences in the physical media NAND memory components, as well as the speed and performance differences, error correction mechanisms such as parity functions accommodate these physical media characteristics.

SSDs are typically made up of a number of NAND packages, each with 1-8 NAND dies per package, with each die made of multiple planes, blocks and finally pages. Another peculiarity with NAND is that NAND may only be written at the page level. In modern drives that may dictate a granularity of 8 KB, 16 KB or even 32 KB. A further characteristic of granularity is that NANDs may only be erased at the block level, which for a typical 25 nm NAND is 256 pages (2048 KB).

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An error correction code (ECC) mechanism performs area efficient implementation of XOR ECC computation in SSDs for reducing the XOR SRAM (Static random-access memory) area requirements for implementing the XOR ECC by caching portions of the XOR context. The method effectively decouples the XOR SRAM size from the underlying (ever increasing) NAND page sizes. Therefore, it becomes possible for a very small XOR SRAM to be used for computing XOR ECC regardless of the underlying NAND page size. By using this method, production cost of SSD controllers is reduced because a very small amount of ECC SRAM (In one example 32 KB is needed for 32 contexts) is needed vs. the traditional 512 KB/1 MB for 16 KB/32 KB NAND pages.

Configurations herein are based, in part, on the observation that capacity of SSDs is continually increasing as the memory technology advances, and with them a corresponding increase in page size is observed. As with most memory technologies, error correction measures such as parity, checksum and redundancy are present with NAND memory, the typical memory medium of SSDs. Unfortunately, conventional approaches to SSD parity require substantial memory area for operation. A plurality of pages defines a context—the atomic area of memory for which corrupt values are recoverable from other values in the context. However, the entire context is stored in an SRAM area reserved for XOR parity operations. SRAM is a type of semiconductor memory that uses bistable latching circuitry to store each bit. The term "static" differentiates it from dynamic RAM (DRAM) which must be periodically refreshed, and SRAM is preferable to DRAM for parity operations due to its speed and addressability.

Accordingly, configurations herein substantially overcome the above-described memory demands of conventional parity operations for SSDs by providing a paging scheme that exchanges portions of a parity component, such as a page, between SRAM and less expensive DRAM, which stores the remainder of the context. The disclosed parity operation applies an XOR function to corresponding memory positions in the pages of the context. In this manner, dedicated error correction (parity) SRAM needs only enough memory for portions of memory, typically a cache line of a page, upon which the parity operation (XOR) is operating. The remaining portions in the context are swapped, or paged out, by cache logic such that the entire context is iteratively processed (XORed) by the parity operation.

Figure 1:
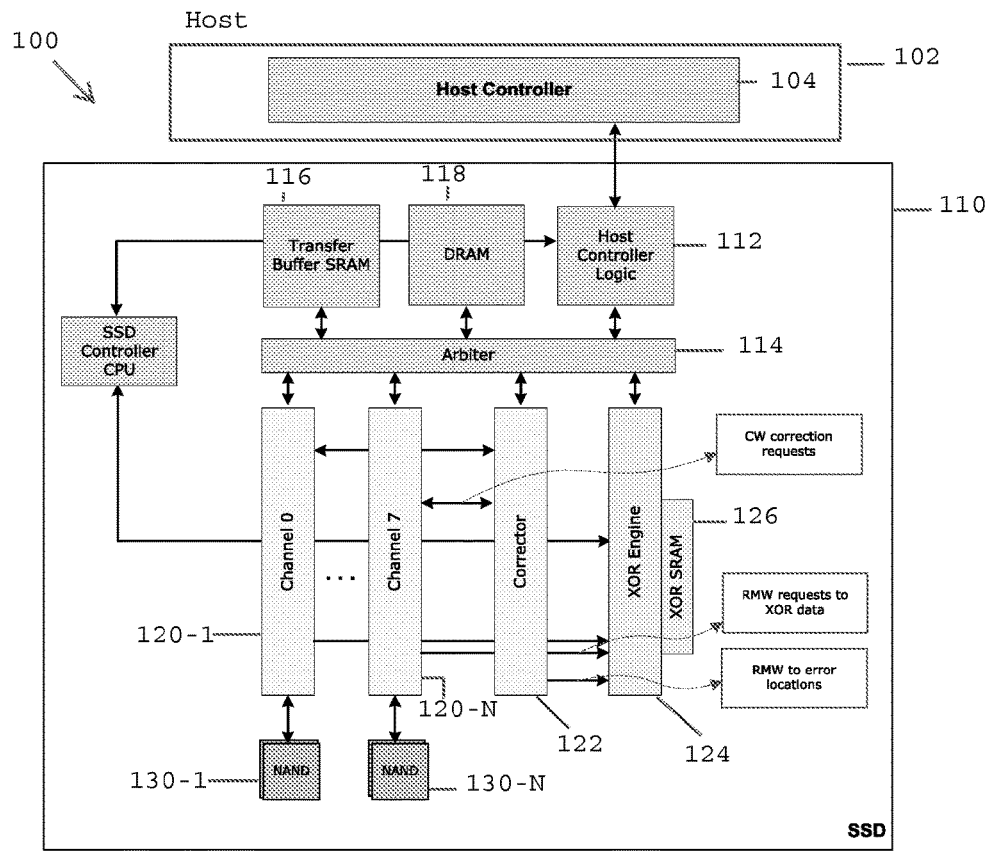
FIG. 1 is a context diagram of a computing and storage environment suitable for use with configurations herein.

FIG. 1 is a context diagram of a computing and storage environment 100 suitable for use with configurations herein. Referring to FIG. 1, in the computing and storage environment 100, an SSD 110 is often employed as a mass storage device responsive to a host computing system 102, such as a laptop, desktop, tablet, smartphone or other portable or stationary computing device. In the SSD, host controller logic 112 is responsive to a host controller 104 on the host 102, and responds to request for storing and retrieving data. In the SSD 110, an arbiter 114 monitors and controls access to transfer buffer memory 116 (typically SRAM) and DRAM 118. The transfer buffer memory 116 temporarily stores data sent between the host 102 and SSD 110, and the DRAM performs administrative tasks, such as storing instructions for manipulating data between the buffer memory 116.

In the SSD 110, an XOR stripe size is the number of pages that need to be XORed together to generate the parity. An XOR context defines a page of XOR-accumulated data for a given stripe. The XOR mechanism protects the SSD 110 from NAND die level failures, NAND programming failures and uncorrectable errors from the NAND-MEDIA-ECC protection. In applying the parity operation, a predetermined number of NAND pages are XORed together to generate parity data for the XOR stripe, and the XOR data is written to the media. In case of a failure, the parity data (in combination with the rest of the data from the stripe, excluding the failed page) is used to restore data on unrecoverable NAND page or die.

A plurality of channels 120-1 . . . 120-N (120 generally) order requests to read and write to NAND memory 130-1 . . . 130-N (130 generally) in response to commands issued to them by the SSD FW. The NAND memory 130 defines the storage area of the SSD, and includes a number of packages, dies, blocks and pages of memory for storing host data, depending on the architecture of the SSD 110. Alternatively, any suitable memory and configuration may be employed with the error correction approach herein, such as 3D crosspoint memory, or other types of RAM (Random Access Memory), including DRAM (Dynamic RAM), SDRAM (Synchronous DRAM), and others. The channels 120 order and present the requests to the arbiter 114. A corrector 122 performs media ECC corrections to the data before XOR engine 124 is invoked for parity operations. An XOR SRAM 126 stores the parity for each of the contexts during the write commands for analysis and, if needed, value recreation by examining corresponding positions in the context during a read command.

Figure 2:
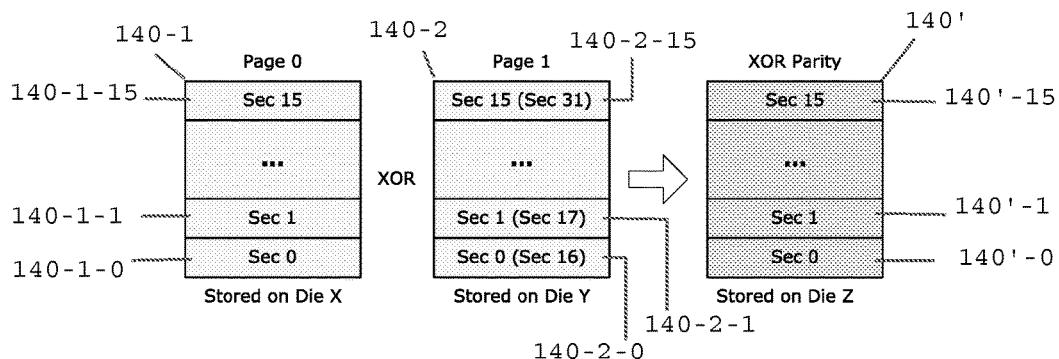
FIG. 2 shows parity generation in the environment of FIG. 1.

FIG. 2 shows parity generation in the environment of FIG. 1 using a parity operation, such as an XOR, applied to memory. A parity component, such as a page of memory, is a predetermined memory area or subdivision of memory employed for the parity operation. A plurality of the parity components define a context, and the parity operation is applied to each of the components to compute the parity. Each of the parity components is the same size, and has corresponding memory locations based on the position in the parity component. In the example of FIG. 2, the parity components 140-1, 140-2 (140 generally) correspond to pages of memory in NAND 130, and includes sixteen sectors 0 . . . 15, labeled as 140-P-S, where P is the page and S is the sector. The parity components 140 (pages) may be contiguous areas of memory, representing sequential sectors, such that sector 0 of page 1 is sector 16 if counted from the start of the context (page 0). The sectors are also similarly sized such that corresponding memory locations for XORing with other sectors may be located. The corresponding memory locations of each sector are employed in the parity operation, such that sector 0 of page 0 (140-1-0) is XORed with sector 0 of page 1 (140-2-0), to generate sector 0 of the parity result 140'-0. Multiple parity components 140 defining the context may be successively XORed (or other parity operation) together to compute the parity result 140' for the parity context, such that an error in any location is correctable from the other parity components in the context. Therefore, in the parity computation as employed herein, a plurality of parity components collectively define a context, and undergo the parity computation for generating a parity result 140' for the context.

The example of FIG. 2 depicts an example sequence of data flowing from transfer buffer 116 to the NAND 130. Assuming the XOR page size is 16 sectors, the first 16 sectors are grouped into one page 140-1 and the next 16 sectors are grouped into second page 140-2. Each of these groups are being written to a different NAND channel 120 but each channel has been configured to use the same XOR context. Each NAND page shall request to RMW (Read/Modify/Write) the values in the XOR context until both of the pages 140 have been processed by their respective channels 120. The order of XOR operations is flexible as long as all locations are XORed together as specified above.

In the example of FIG. 2, the XOR engine 124 is configured with a page size of 16 sectors, and accordingly, it will generate 16 sectors of parity. Sector 0 of page 1 is XORed with sector 0 of page 2 to generate sector 0 of the parity, and continue in an iterative manner. Iteratively replacing the portions and applying the parity operations therefore decouples a required size of the first memory from the size of the page (parity component 140). In the example shown, the context represents the parity result for a memory die, however any suitable memory unit may be employed for parity results.

Figure 3:
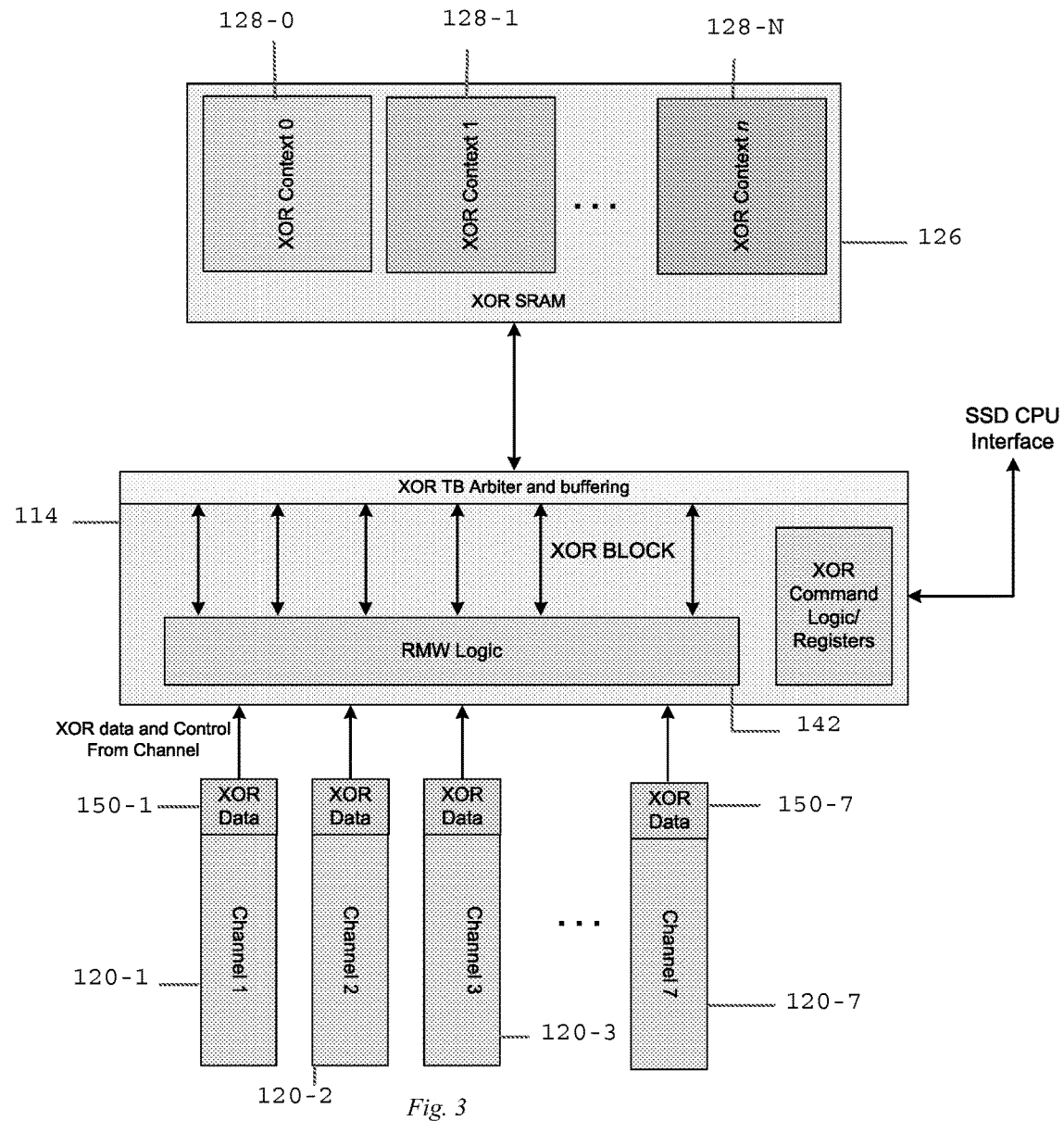
FIG. 3 shows conventional parity computations.

FIG. 3 shows conventional parity computations. As shown in FIG. 3, conventional approaches store an entire context 128-0 . . . 128-N (128 generally) in a parity memory 126 or buffer for computing the parity result for the entire context. The parity memory 126 is a high speed performance area well suited for parity computation, such as an SRAM, which may add substantial costs in the case of large pages and/or contexts. In contrast to conventional approaches, the proposed approach stores only a portion of the parity component, such as a cache line, in the parity memory for efficiently computing parity operations, and pages or exchanges the cache lines for a DRAM (or other suitable memory area) stored cache line. Further, there may be multiple contexts 128 simultaneously computing and storing parity results, depending on the SSD 110 size (i.e. total NAND 130 capacity). While conventional approaches store the complete context 128 in SRAM for all contexts on the drive (SSD 110), the disclosed approach need only store and operate on the portions of the parity components 140. The portions may be successively exchanged for other corresponding portions, such that only two need be stored simultaneously, as in FIG. 2. In other words, corresponding portions on pages 0 and 1 may be XORed, then the portion on page 0 exchanged (mapped) for the parity component on page 2, and so on.

Advancements in SSD technology impact the ECC mechanism. Since the size of NAND pages 140 is increasing with each generation, new SSD controllers need to increase the size of the XOR SRAM 126 for the same number of XOR contexts. Further, the NAND 130 can program pages in single plane mode and dual plane modes. Dual plane mode is used for increased performance in modern SSDs. Up to 8 XOR dual-plane XOR contexts may be employed per core. So for dual-core SSD controllers this translates to 16 single plane contexts per core and 32 single plane contexts for two cores. Therefore, for 32 KB NAND pages, the XOR SRAM size is estimated to be around 1 MB for 32 single plane contexts, which substantially increases cost. Accordingly, configurations herein present an approach that decouples the XOR SRAM 126 size from the underlying NAND page 140 size.

Various arrangements of pages and contexts may be performed, depending on the size and performance constraints for the SSD. As indicated above, larger SSDs need larger parity memory (SRAM) to store all contexts, therefore, computing parity operations on only portions at a time allows paging of the parity components to mitigate the overall SRAM demand.

In operation, the XOR parity generation operation is initiated by a Read-Modify-Write request from the channel 120. The channel 120 provides the new data along with the page address offset in the XOR SRAM 126. The XOR engine 124 is responsible for reading the previous data at this location in the XOR SRAM 126, XORing it with the new data provided by the channel, and writing it back to the same address location in the XOR SRAM 126. XOR command logic keeps track of how many pages have been XORed in all channels 120 and when it is time for writing the XOR context to the NAND. An arbiter 114 provides access for the NAND channels, XOR parity dump and the corrector 122. The corrector 122 corrects all the errors in the XORed pages on in XOR rebuild operation, which is the inverse of the XOR parity generation operation.

As shown in FIG. 3, the XOR SRAM 126 is divided into n identical XOR contexts 128-1 . . . 128-N. Each one of these XOR contexts 128 is capable of independently calculating the XOR parity of the data passed to it. One advantage of complete context allocation in SRAM 126 is that each channel 120 can be operating in a completely different part of the page and the XOR parity would still be computed correctly. But this approach requires a substantial amount of XOR SRAM 126 since each XOR context has a dedicated area in the XOR SRAM 126.

Figure 4:
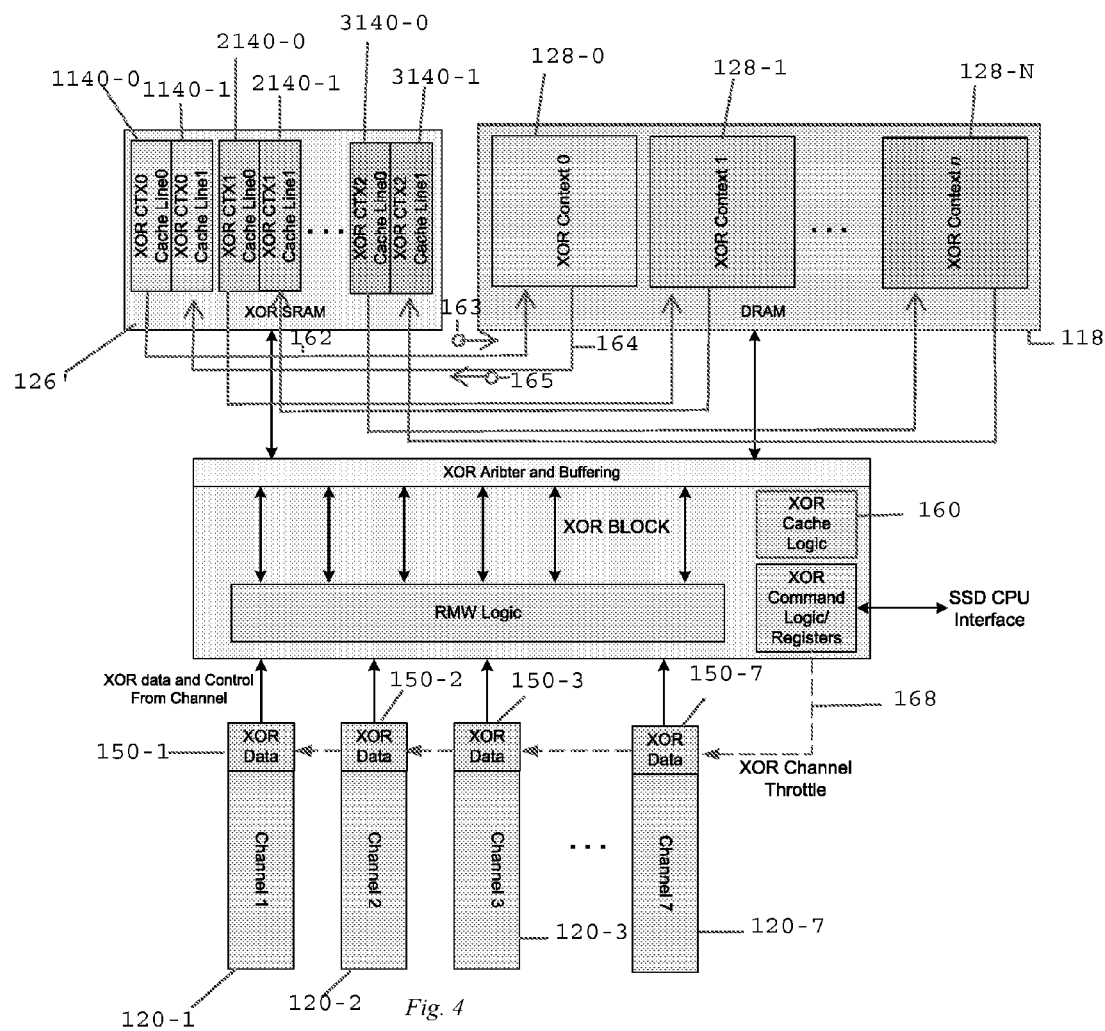
FIG. 4 shows an apparatus for parity computation as disclosed herein.

FIG. 4 shows an apparatus for parity computation as disclosed herein. Referring to FIGS. 1, 3 and 4, memory channels 120 exchange data between the host 102 and SSD 110. RMW (Read/Modify/Write) logic 142 in the arbiter 114 identifies the XOR data 150-1 representing the portions 163, 165 of the parity components 140. Cache logic 160 stores the portions 165, such as cache lines 1140-0, 1140-1 in a first memory 126' and maintains the full context 128 in a second memory, such as DRAM 118. Portions from other contexts, such as 2140-0, 2140-1, 3140-0 and 3140-1, are also concurrently stored in first memory 126', which in the example configuration is a reduced size SRAM 126', relative to SRAM 126.

In the example of FIG. 4, context 128-0 employs cache areas 1140-0 and 1140-1, for cache lines 0 and 1 of context 0 (128-0), respectively. Other areas 2140-0, 2140-1, 3140-0, 3140-1 draw from other contexts 128 in a similar manner. The portions stored in the first memory 126' correspond to a cache line (areas 1140-0, 1140-1) received by monitoring a cache channel 120 for memory accesses, such that each of the stored portions include corresponding locations on respective pages for applying the parity operations. Upon XORing cache lines 0 and 1, parity results for portions (cache lines 1140-0, 1140-1) are computed and stored, the portion 163 returned via 162 (or simply discarded) and a successive portion (cache line) 165 is transferred into the cache memory 126', as shown by arrow 164, for computing successive results. Other contexts 128-1 . . . 128-N are paged similarly. The portions shown correspond to first and second pages 140-1, 140-2 (labeled page 0 and page 1) in the context 128, and include a cache line 1140 for each respective page, and the computed parity value contributes to a corresponding cache line in the parity value, wherein iteratively replacing the portions applies the parity operation to corresponding cache lines in successive pages 140 in the context for computing the parity result for the context 128.

When any particular channel 120 reaches the boundary of a XOR cache line, the XOR cache logic 160 will throttle the channel from making forward progress, until all other channels catch up. An XOR channel throttle 168 signals the channels 120 to pace the channels in making similar write progress. The cache lines 120 represent non-contiguous sectors of the pages including the corresponding portions. The cache logic 160 identifies the cache line 1140-0, 1140-1 from cache channel 120, such that the cache line defines a portion of data on the page, and throttles the identified cache lines 120 to evenly distribute the portions 1140 corresponding to different pages for aligning a completion time of all pages in the context 128.

The method of memory error correction, in the example of FIG. 4, therefore includes partitioning a parity component 140 such as a page into a plurality of portions 1140, in which the parity component is based on a memory space occupied by each of the pages designated for error correction such that a plurality of parity components (pages) define a context 128. The cache logic 160 stores corresponding portions of the parity components in a first memory area, such as SRAM 126', in which the first memory area is responsive to a parity operation for computing a parity value for the corresponding portions, in which a parity value for the context is based on a plurality of parity components, and a parity result represents all parity components in the context 128. The cache logic 160 applies the parity operations to the portions stored in the first memory area 126' and iteratively replaces the portions with other portions from a second memory area 118 for applying the parity operation to each of the portions until all portions of the parity component (such as a page 140) have undergone the parity operation, and in which the second memory area 118 is sufficiently large for storing the entire context 128. The cache logic 160 therefore exchanges the portions 1140 of the parity components from the first memory 126' area with successive portions 1140-N of the parity components 140 stored in the second memory 118, and aggregates the stored portions of the parity results to compute a parity result for the context 128.

In the example configuration, the above is preceded by identifying the parity component 140, in which the parity component 140 defines a subdivision of the memory upon which parity operations are applied. In the example arrangement, the parity component 140 is a page, however any suitable subdivision may be employed. Thus, the disclosed parity sequence subdivides parity computations, conventionally occurring on a context 128 of pages (or other parity component) all stored in the first (SRAM) memory 126, with a portion of the page, XORing the portions, then swapping the portion with the other portions in corresponding positions on the other pages. Corresponding portions represent an area, such as a cache line, in the same position or offset on each page of the context. Aggregation of the parity computation for the portions of each of the pages 140 yields the parity value across all the portions 1140 in the context 128, and the parity values for each set of corresponding portions collectively define the parity result for the page (parity component). Parity operations are applied to the portions 1140-N to compute a parity value, the parity values for a series of portions aggregated to a parity value for the context, and the combined parity values for a all parity components (pages) of the context are aggregated to define the parity result for the context 128.

Identifying the pages 140 and portions 1140 also includes identifying the context 128 of a parity sequence, such that the context includes the memory pages 140 aggregated for computing a parity result, such that the parity context defines a result from which inaccurate values can be recreated from other values in a corresponding position in the context. As shown in FIGS. 3 and 4, instead of allocating the full size of the context 128 in the XOR SRAM 126, only a portion of the XOR context is kept in the XOR SRAM, while the rest of the XOR context 128 resides in the more plentiful DRAM. As the channels 120 make progress through the NAND 130 page being written, portions of the XOR context are demand paged in 165 and out 163 of the XOR SRAM 126' which works effectively as an XOR cache. Each cached context in the XOR SRAM 126' has a set of ping-pong XOR cache lines 1140-0, 1140-1. When XOR computation on a cache line worth of data (typically 512-528B) is complete, it is transferred to the DRAM (via arrow 162) and the channels continue computing the XOR context in the other available XOR cache line in the ping-pong set.

The proposed technique may involve staging the program command issue at the channel level. This can be easily accomplished because commands are typically issued in stages or waves during normal operation. When any particular channel 120 reaches the boundary of a XOR cache line, the XOR engine 124 will throttle the channel 120 from making forward progress, until the other channels 120 catch up. In effect, this would pace the channels 120 in making similar write progress. Since the DRAM 126' can be accessed at relatively high bandwidth (2 GB/sec or more), compared to the channel 120 bandwidth (up to 400 MT/s) there is sufficient time to dump the computed XOR context cache in one of the ping-pong cache lines, before this XOR cache line is needed again.

Figures 5A, 5B:
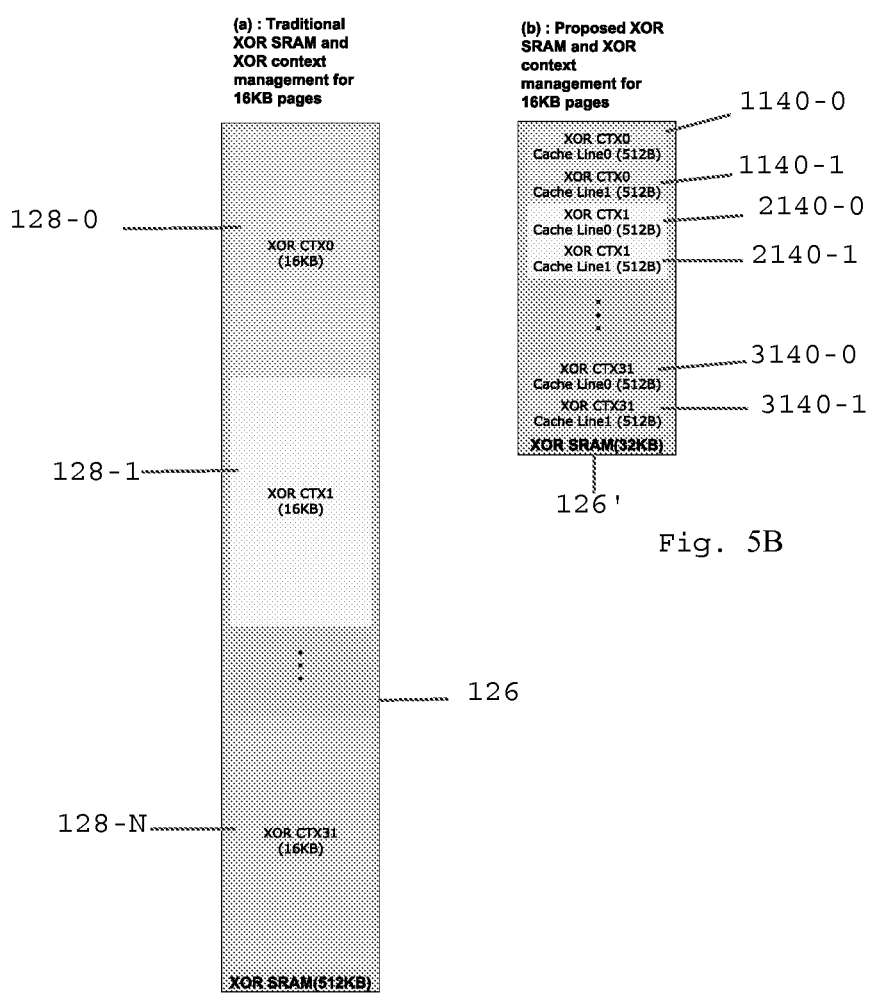
FIGS. 5A and 5B are a graphical depiction of memory usage for parity computation.

FIGS. 5A and 5B are a graphical depiction of memory usage for parity computation, and shows the relative sizes of the XOR SRAM 126' and its management for a conventional implementation vs. the proposed solution, respectively. Referring to FIGS. 3-5, for 32 KB page sizes and 32 single plane contexts 128, the size of the XOR SRAM 126 required in the typical solution is ~1 MB, while in the caching approach we only need 32 KB of XOR SRAM 126'. Using the approach of FIG. 4, employing the cache logic 160 for paging and transferring the portions 163, 165 between the first memory (SRAM) 126' and the second memory (DRAM) 118. FIG. 5A shows relative memory consumption for SRAM storage of an entire context 128-0 . . . 128-N, while FIG. 5B shows memory requirements for storing only portions 1140, 2140, 3140 in SRAM 126, as outlined above. As a further optimization, the first memory 126', shown as SRAM, could be a partition or region of the transfer buffer SRAM 116, rather than a separate component 126', for further reducing the number of memory components. This may include partitioning a transfer buffer memory area used for data transfer to a host for designating the first memory 126' as a partition of the transfer buffer memory 116.

The system and methods above may be performed by a set of computer instructions on a non-transitory storage medium, in which the instructions perform a method for paging parity operations in a computer memory, including identifying a stripe indicative of areas of memory employed for accumulating a parity result, the stripe indicative of a plurality of pages, such that each page in the stripe having locations corresponding to the other pages in the stripe. The method stores corresponding portions of a subset of the pages in a first memory for applying a parity operation to compute a parity result, and alternates the storing and parity computation in an iterative manner until each corresponding location in the stripe has undergone the parity operation.

Alternating occurs by storing portions between a first memory and a second memory for alternating storage of the corresponding portions, and the parity result for the context is obtained by determining an accumulation of the applied parity operations as the parity result of the identified stripe. The first and second memory may have differing costs and/or speed, so that parity operations may be paged into a faster area and swapped out to a more abundant, lower cost memory. This includes identifying the portions from a cache channel indicative of memory accesses from a host, and designating a portion upon receipt of a cache line of memory accesses. The stripe is therefore indicative of a context, such that the context defines a parity result from which inaccurate values can be recreated from other values in a corresponding position in the context.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method comprising:
    partitioning one or more pages into a plurality of cache lines, the one or more pages based on a memory space designated for error correction of data stored in a first memory device, the one or more pages stored in a first memory area of a second memory device and defining a context, the first memory area large enough to store the one or more pages defining the context;
    storing at least two cache lines of the plurality of cache lines in a second memory area of a third memory device, the second memory area responsive to a parity operation for computing a parity value for cache lines stored in the second memory area;
    applying the parity operation to the at least two cache lines stored in the second memory area; and
    iteratively replacing at least one of the at least two cache lines stored in the second memory area in succession with at least one other cache line of the plurality of cache lines of the partitioned one or more pages stored in the first memory area and iteratively applying the parity operation to cache lines stored in the second memory area until the parity operation has been applied to all cache lines of the one or more pages, wherein iteratively replacing cache lines and iteratively applying the parity operation decouples a required size of the second memory area from a size of the one or more pages defining the context.

2. The method of claim 1, further comprising:
    identifying a page of the one or more pages, the page defining a subdivision of the memory space of the first memory device upon which parity operations are applied for error correction of data stored in the first memory device.

3. The method of claim 1, comprising the cache lines correspond to at least first and second pages in the context, further including a cache line for each respective page.

4. The method of claim 3, comprising the computed parity values of the at least two cache lines stored to the second memory area contribute to computed values of subsequently stored cache lines stored to the second memory area, iteratively replacing the cache lines and iteratively applying the parity operation to successive cache lines of the partitioned one or more pages to compute a parity result for the one or more pages defining the context.

5. The method of claim 1, comprising each of the at least two cache lines stored in the first memory area corresponds to a cache line received by monitoring a cache channel for memory access to the first memory device such that each of the at least two cache lines include corresponding locations on respective pages of the one or more pages for applying the parity operations.

6. The method of claim 1, further comprising:
exchanging at least one of the at least two cache lines of the pages from the second memory area of the third memory device with successive cache lines of the partitioned one or more pages stored in the first memory area of the second memory device; and
aggregating results of applied parity operations to compute a parity result for the one or more pages defining the context.

7. The method of claim 1, the parity operation for computing the parity value for the at least two cache lines stored to the second memory area comprises use of an XOR function that includes parity data maintained in the at least two cache lines as inputs to compute the parity value.

8. The method of claim 1, further comprising:
partitioning a transfer buffer memory area used for data transfer to a host for designating the second memory area as a partition of the transfer buffer memory area.

9. The method of claim 1, comprising the first memory device including one or more non-volatile memory dies, the second memory device including dynamic random access memory and the third memory device including static random access memory.

10. A storage device comprising:
a stripe indicative of a memory space arranged to accumulate a parity result for error correction of data stored in a first memory device, the stripe indicative of a plurality of pages for storing data, each page of the plurality of pages having locations to store data that corresponds to respective locations of other pages of the plurality of pages that also store data, the plurality of pages defining a context;
a second memory device;
a third memory device; and
an arbitrator including logic, the logic to:
partition each page of the plurality of pages into a plurality of cache lines and cause the plurality of cache lines to be stored to a first memory area of the second memory device;
store at least two cache lines from among the plurality of cache lines to a second memory area of the third memory device;
apply a parity operation on the at least two cache lines stored to the first memory area to compute a parity value; and
iteratively replace at least one of the at least two cache lines stored in the second memory area in succession with at least one other cache line of the plurality of cache lines stored in the first memory area and iteratively apply the parity operation to cache lines stored in the second memory area until the parity operation has been applied to all cache lines of the plurality of pages, wherein the logic to iteratively replace cache lines and iteratively apply the parity operation decouples a required size of the second memory area from a size of the plurality of pages defining the context.

11. The storage device of claim 10, comprising an interface to an attached computing device for receiving the data stored in the first memory device.

12. The storage device of claim 11, comprising each cache line being arranged for memory accesses to the first memory device from the attached computing device.

13. The storage device of claim 10, comprising:
the first memory device includes a plurality of memory dies, the plurality of pages separately include respective memory spaces maintained in separate memory dies from among the plurality of memory dies.

14. The storage device of claim 10, comprising:
the first memory device to include one or more non-volatile memory dies;
the second memory device to include dynamic random access memory; and
the third memory device to include static random access memory.

15. A computer program product having instructions encoded on a non-transitory machine readable medium that when executed by a system cause the system to:
partition one or more pages into a plurality of cache lines, the one or more pages based on a memory space designated for error correction of data stored in a first memory device, the one or more pages stored in a first memory area of a second memory device and defining a context, the first memory area large enough to store the one or more pages defining the context;
store at least two cache lines of the plurality of cache lines in a second memory area of a third memory device, the second memory area responsive to a parity operation for computing a parity value for cache lines stored in the second memory area;
apply the parity operation to the at least two cache lines stored in the second memory area; and
iteratively replace at least one of the at least two cache lines stored in the second memory area in succession with at least one other cache line of the plurality of cache lines of the partitioned one or more pages stored in the first memory area and iteratively apply the parity operation to cache lines stored in the second memory area until the parity operation has been applied to all cache lines of the one or more pages, wherein iteratively replacing cache lines and iteratively applying the parity operation decouples a required size of the second memory area from a size of the one or more pages defining the context.

16. The computer program product of claim 15, further comprising the instructions to cause the system to:
identify a page of the one or more pages, the page defining a subdivision of the memory space of the first memory device upon which parity operations are applied for error correction of data stored in the first memory device.

17. The computer program product of claim 15, comprising the cache lines correspond to at least first and second pages in the context, further including a cache line for each respective page.

18. The computer program product of claim 17, comprising the computed parity values of the at least two cache lines stored to the second memory area contribute to computed values of subsequently stored cache lines stored to the second memory area, the instructions to cause the system to iteratively replace the cache lines and iteratively apply the parity operation to successive cache lines of the partitioned one or more pages cause the system to compute a parity result for the one or more pages defining the context.

19. The computer program product of claim 15, comprising each of the at least two cache lines stored in the first memory area corresponds to a cache line received by monitoring a cache channel for memory access to the first memory device such that each of the at least two cache lines include corresponding locations on respective pages of the one or more pages for the system to apply the parity operations.

20. The computer program product of claim 15, further comprising the instructions to cause the system to:
- exchange at least one of the at least two cache lines of the pages from the second memory area of the third memory device with successive cache lines of the partitioned one or more pages stored in the first memory area of the second memory device; and
- aggregate results of applied parity operations to compute a parity result for the one or more pages defining the context.

21. The computer program product of claim 15, the parity operation for computing the parity value for the at least two cache lines stored to the second memory area comprises use of an XOR function that includes parity data maintained in the at least two cache lines as inputs to compute the parity value.

22. The computer program product of claim 15, further comprising the instructions to cause the system to:
- partition a transfer buffer memory area used for data transfer to a host for designating the second memory area as a partition of the transfer buffer memory area.

23. The computer program product of claim 15, comprising the first memory device to include one or more non-volatile memory dies, the second memory device to include dynamic random access memory and the third memory device to include static random access memory.

* * * * *